United States Patent
Uchigashima et al.

(10) Patent No.: US 7,404,330 B2
(45) Date of Patent: Jul. 29, 2008

(54) PRESSURE SENSOR

(75) Inventors: Hiroshi Uchigashima, Kariya (JP);
Kiyoshi Otsuka, Kariya (JP); Osamu Itoh, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/717,167

(22) Filed: Mar. 13, 2007

(65) Prior Publication Data
US 2007/0220989 A1 Sep. 27, 2007

(30) Foreign Application Priority Data
Mar. 15, 2006 (JP) ............... 2006-071300

(51) Int. Cl.
*G01L 9/00* (2006.01)
(52) U.S. Cl. ............... 73/717; 73/715; 257/777; 361/283.1
(58) Field of Classification Search ........... 73/700–756; 361/283.1–283.4; 257/734–786
See application file for complete search history.

(56) References Cited

U.S. PATENT DOCUMENTS 6,595,065 B2 * 7/2003 Tanizawa et al. ............ 73/720
6,651,508 B2 * 11/2003 Baba et al. .................. 73/754
7,021,152 B2 * 4/2006 Tenerz ........................ 73/756
7,331,236 B2 * 2/2008 Smith et al. .................. 73/703

FOREIGN PATENT DOCUMENTS

| EP | 1 118 849 B1 | 8/2002 |
| JP | A-2000-298071 | 10/2000 |

* cited by examiner

*Primary Examiner*—Edward Lefkowitz
*Assistant Examiner*—Jermaine Jenkins
(74) *Attorney, Agent, or Firm*—Posz Law Group, PLC (57) ABSTRACT

A pressure sensor includes a metal housing and a semiconductor chip. The housing has a diaphragm unitary with the housing and an inlet for introducing fluid to the diaphragm. The inlet has a first end exposed to the diaphragm and a second end exposed to an outside of the housing. The housing has a thin-wall portion at the first end of the inlet and the thin-wall portion serves as the diaphragm. The chip is mounted on the diaphragm. The area and thickness of the chip are set so that separation between the chip and diaphragm can be prevented. Since the separation is prevented based on the area and thickness of the chip, there is no need that the diaphragm is made of a material having a thermal expansion coefficient similar to that of the chip.

11 Claims, 6 Drawing Sheets

PRESSURE SENSOR

CROSS REFERENCE TO RELATED APPLICATION

This application is based on and incorporates herein by reference Japanese Patent Application No. 2006-71300 filed on Mar. 15, 2006.

FIELD OF THE INVENTION

The present invention relates to a pressure sensor having a strain gauge mounted on a metal diaphragm.

BACKGROUND OF THE INVENTION

A pressure sensor using a metal diaphragm is disclosed in, for example, JP-A-2000-298071. The pressure sensor includes a package consisting of a metal housing having a fluid inlet and a resin connector having a terminal pin. The housing and connector are integrally jointed together. The package includes a metal stem and a sensing member. A portion of the metal stem is thin-walled to provide a metal diaphragm. The sensing member is mounted on the metal diaphragm through a glass paste (e.g., low-melting glass). The sensing member has a strain gauge formed by doping a semiconductor chip with p-type impurities and generates an electrical signal corresponding to pressure of the fluid introduced to the diaphragm via the fluid inlet. The electrical signal is transmitted to an external device via the terminal pin of the connector.

In such a pressure sensor, there is a fear that the semiconductor chip is detached from the stem (i.e., diaphragm) due to difference in thermal expansion coefficient between the semiconductor chip and the stem. Therefore, the stem is made of, for example, kovar, which has a thermal expansion coefficient similar to that of the semiconductor chip.

In some applications, kovar is not suitable for use in the housing in terms of resistance to corrosion. Further, the use of kovar is costly. Therefore, the housing is made of a different material than the stem. For example, the housing is made of stainless steel, aluminum, iron, or the like.

Since the housing and the stem are made of different materials, the housing and the stem are separate pieces. As a result, the number of parts required for the pressure sensor becomes increased, the structure of the pressure sensor becomes complicated, and the size of the pressure sensor becomes increased. Further, the seam between the housing and the stem needs to be sealed to prevent the fluid from leaking at the seam. Inadequate sealing of the seam causes the pressure sensor to operate improperly.

SUMMARY OF THE INVENTION

In view of the above-described problem, it is an object of the present invention to provide a pressure sensor using a diaphragm unitary with a housing.

A pressure sensor includes a metal housing and a semiconductor chip. The metal housing has a diaphragm and an inlet for introducing fluid to the diaphragm. The inlet has a first end exposed to the diaphragm and a second end exposed to an outside of the housing. The housing has a thin-wall portion at the first end of the inlet and the tin-wall portion serves as the diaphragm. Thus, the diaphragm is unitary with the housing, i.e., the housing and the diaphragm are a single piece. The semiconductor chip is mounted on the diaphragm and includes a strain gauge for producing an electrical signal corresponding to deformation of the diaphragm caused by pressure of the fluid.

A double logarithmic relationship between shear stress T acting at an interface between the semiconductor chip and the diaphragm and distance X (mm) from an outer edge of the interface is given by the following equation using a parameter K:

$$T = KX^{0.4}$$

An experiment conducted by the present inventors shows that separation between the semiconductor chip and the diaphragm can be prevented when the parameter K is less than or equal to 17 (i.e., seventeen). The area and thickness of the semiconductor chip is set so that the parameter K is less than or equal to 17. For example, the area of the semiconductor chip is set less than or equal to 3.0 square millimeters ($mm^2$), and the thickness of the semiconductor chip is set less than or equal to 30 micrometers ($\mu m$).

The separation between the semiconductor chip and the diaphragm is prevented based on the area and thickness of the semiconductor chip. Therefore, there is no need that the diaphragm is made of a material having a thermal expansion coefficient similar to that of the semiconductor chip. Therefore, the housing and the diaphragm can be made of the same material so that the housing and the diaphragm can be a single piece.

Since the housing and the diaphragm are a single piece, the number of parts required for the pressure sensor can be reduced. Further, the structure of the pressure sensor can be simplified. Furthermore, since there is no seam between the housing and the diaphragm, leakage of the fluid at a seam can be prevented so that the pressure sensor can operate properly.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
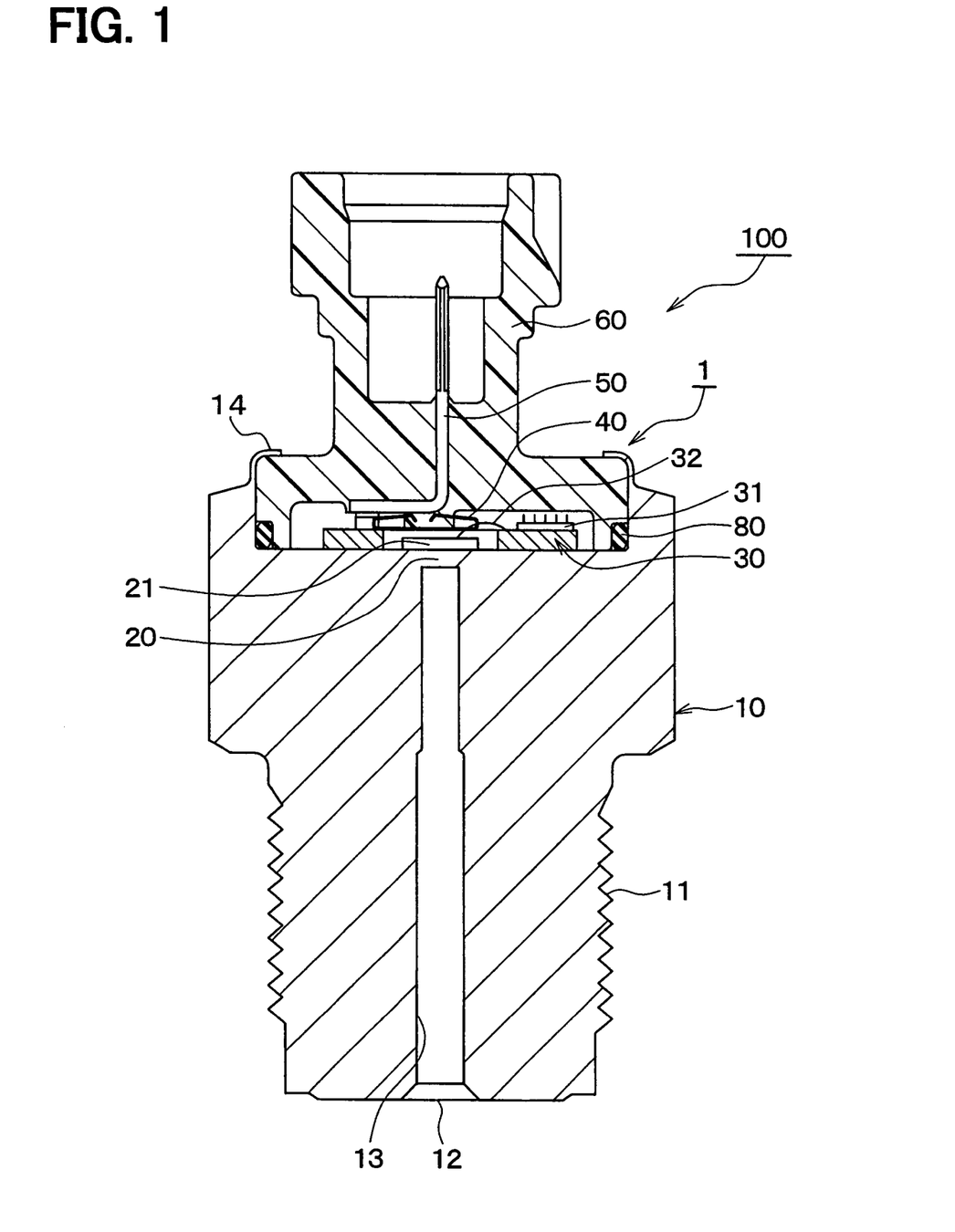
FIG. 1 is a cross-sectional view of a pressure sensor according to a first embodiment of the present invention.

As shown in FIG. 1, a pressure sensor 100 according to a first embodiment of the present invention includes a package 1 having a metal housing 10 and a resin connector 60 with a terminal pin 50. The housing 10 is integrally joined to the connector 60 at a first end side.

The housing 10 has a hollow cylindrical shape and a screw thread 11 on its outer surface at a second end side. Therefore, the housing 10 can be screwed into an object to be sensed. The housing 10 has an opening 12 and a fluid inlet 13. The opening 12 is provided to the second end of the housing 10, and the inlet 13 extends through the housing 10 from the second end side to the first end side along a central axis of the housing 10.

At a tip of the inlet 13, the housing 10 is thin-walled to provide a diaphragm 20 that is elastically deformable by pressure. Fluid from the object to be sensed is introduced into the housing 10 via the opening 12 and transmitted to the diaphragm 20 via the inlet 13.

Figure 2A:
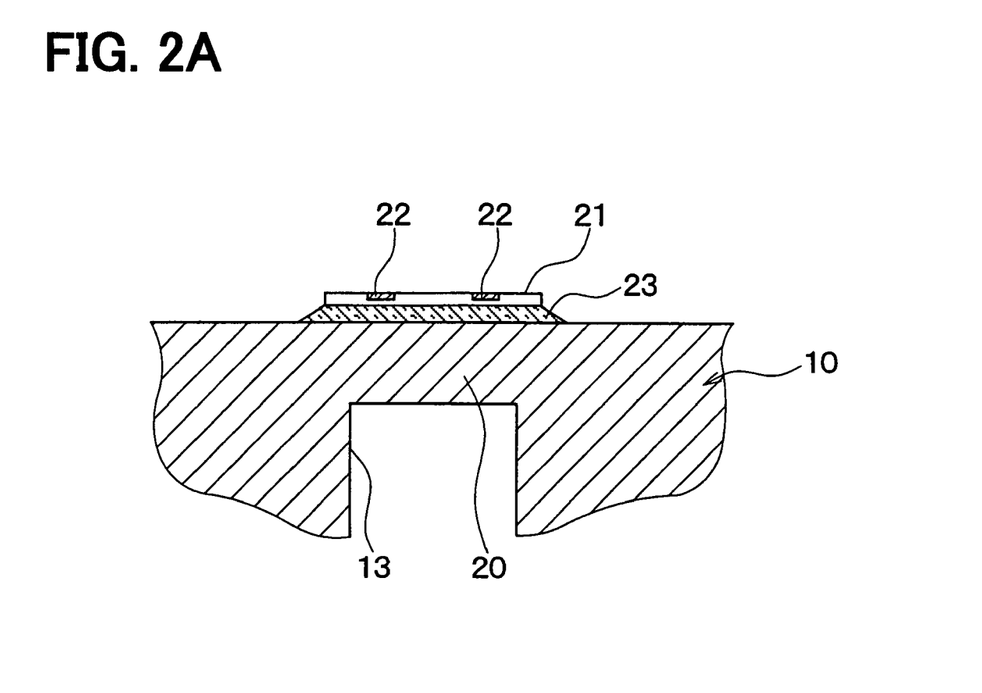
FIG. 2A is an enlarged view of a portion of FIG. 1.
Figure 2B:
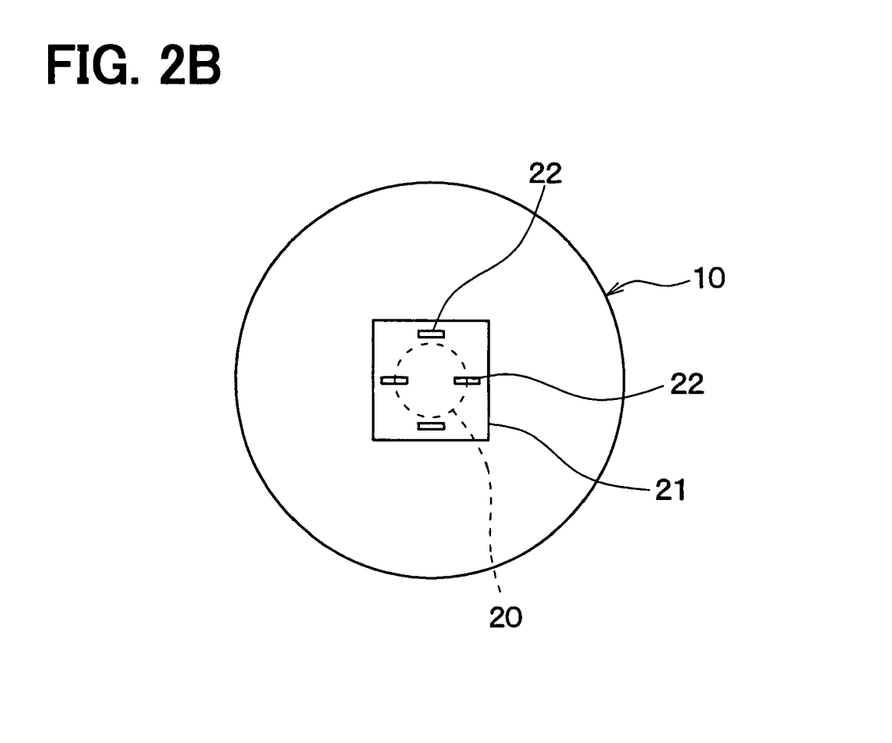
FIG. 2B is a top view of FIG. 2B.

As shown in FIGS. 2A, 2B, a semiconductor chip 21 is mounted on the diaphragm 20 through a low-melting glass 23. The semiconductor chip 21 is based on a silicon substrate. The semiconductor chip 21 has a strain gauge formed by doping a surface of the silicon substrate with p-type impurities. The strain gauge includes four gauge members 22 that are connected in a Wheatstone bridge configuration. When the diaphragm 20 is deformed by pressure of the fluid transmitted via the inlet 13, the strain gauge outputs an electrical signal corresponding to the deformation of the diaphragm 20. Thus, the semiconductor chip 21 outputs an electrical signal corresponding to the pressure of the fluid transmitted to the diaphragm 20.

Specifically, when the diaphragm 20 is deformed by the pressure of the fluid transmitted via the inlet 13, the strain gauge is deformed with the diaphragm 20. As a result, a resistance of the strain gauge changes due to piezoresistive effect. Therefore, when a constant voltage is applied to the strain gauge, the strain gauge outputs the electrical signal corresponding to the deformation of the diaphragm 20. Thus, the semiconductor chip 21 outputs the electrical signal corresponding to the pressure.

The area and thickness of the semiconductor chip 21 suitable for prevention of separation between the semiconductor chip 21 and the diaphragm 20 are discussed below.

The present inventors use a Finite-Element Method (FEM) to calculate shear stress T acting at an interface between the semiconductor chip 21 including the low-melting glass 23 and the diaphragm 20. A double logarithmic relationship between the shear stress T and distance X from an outer edge of the interface is given by the following approximate equation using a parameter K:

$$T = KX^{\lambda}$$

In short, when plotted on a double logarithmic graph, the relationship between the shear stress T and the distance X approximates a straight line given by the above equation. In the above equation, represent a slope of the straight line. According to the result of the FEM analysis, the slope becomes 0.4 in each case where mechanism of destruction is the same. Thus, the degree of the separation between the semiconductor chip 21 and the diaphragm 20 is given by:

$$T = KX^{0.4}$$

An experiment conducted by the present inventors shows that when the parameter K exceeds 17 (i.e., seventeen), the separation between the semiconductor chip 21 and the diaphragm 20 occurs. Therefore, the area and thickness of the semiconductor chip 21 needs to be set so that the parameter K can be less than or equal to 17.

Figure 3:
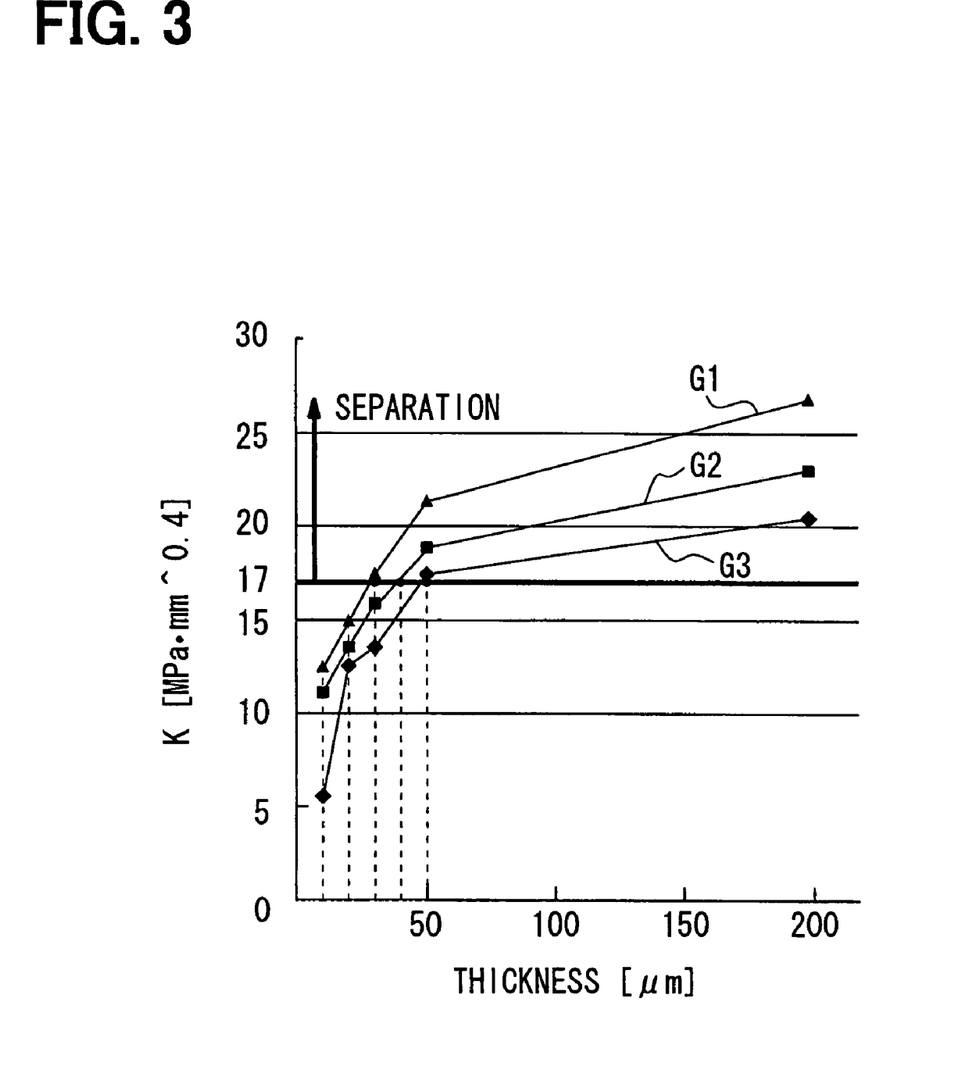
FIG. 3 is a graph showing a result of an experiment for determining the area and thickness of a semiconductor chip, suitable for prevention of separation between the semiconductor chip and a diaphragm.

In FIG. 3, G1 represents the case of the area of 3.0 square millimeters ($mm^2$), G2 represents the case of the area of 1.5 square millimeters, and G3 represents the case of the area of 1.0 square millimeters. The unit of the parameter K is $MPa \cdot mm^{0.4}$. As shown in FIG. 3, as the area of the semiconductor chip 21 is small, the degree of the separation is small. This means that as the area of the semiconductor chip 21 is small, thermal expansion of the semiconductor chip 21 is small and consequently the share stress is small. Likewise, as the thickness of the semiconductor chip 21 is small, the degree of the separation is small. This means that as the thickness of the semiconductor chip 21 is small, the share stress is small.

Based on the experiment result, the area of the semiconductor chip 21 is set less than or equal to 3.0 square millimeters, and the thickness of the semiconductor chip 21 is set less than or equal to 30 micrometers, for example. In such an approach, the parameter K does not exceed 17 so that the separation between the semiconductor chip 21 and the diaphragm 20 can be prevented. Alternatively, the area of the semiconductor chip 21 may be set less than or equal to 1.5 square millimeters, and the thickness of the semiconductor chip 21 may be set less than or equal to 40 micrometers. Alternatively, the area of the semiconductor chip 21 may set less than or equal to 1.0 square millimeters, and the thickness of the semiconductor chip 21 may be set less than or equal to 50 micrometers.

Return to FIG. 1, a circuit board 30 is mounted to the first end of the housing 10. The circuit board 30 includes an IC chip 31, a signal processing circuit (not shown), and a spring terminal 40. The circuit board 30 is electrically connected to the semiconductor chip 21 by bonding wires 32. The electrical signal outputted from the semiconductor chip 21 is inputted to the signal processing circuit and the IC chip 31 of the circuit board 30. The spring terminal 40 is formed by bending a metal plate into a U-shape, for example. A first end portion of the spring terminal 40 is fixed to the circuit board 30 by an electrically conductive adhesive. A second end portion of the spring terminal 40 touches the terminal pin 50 due to spring force. Thus, the spring terminal 40 electrically connects the circuit board 30 and the terminal pin 50. The electrical signal inputted to the signal processing circuit and the IC chip 31 of the circuit board 30 is processed and outputted to an external device via the terminal pin 50.

The terminal pin 50 and the connector 60 are integrally joined together, for example, using insert-molding technology. The terminal pin 50 has a first end portion exposed to a first surface of the connector 60 to be connectable to the external device and a second end portion exposed to a second surface of the connector 60 to touch the second end portion of the spring terminal 40.

As shown in FIG. 1, the housing 10 has hook portions 14 for catching the second surface side of the connector 60 so that the housing 10 and the connector 60 can be assembled into the package 1. Further, an O-ring 80 is place between the housing 10 and the connector 60 to form a seal. Thus, the semiconductor chip 21 and the circuit board 30 are sealed inside the package 1 to be protected from moisture, external mechanical stress, and the like.

According to the first embodiment, the area and thickness of the semiconductor chip 21 are set so that the separation between the semiconductor chip 21 and the diaphragm 20 can be prevented. Therefore, there is no need that the diaphragm 20 is made of a material having a thermal expansion coefficient similar to that of the semiconductor chip 21. The flexibility in selecting materials for the diaphragm 20 is increased so that the housing 10 and the diaphragm 20 can be made of the same material. For example, the housing 10 and the diaphragm 20 may be made of stainless steel, aluminum, iron, or the like.

Since the housing 10 and the diaphragm 20 can be made of the same material, the diaphragm 20 can be unitary with the housing 10. In short, the housing 10 and the diaphragm 20 can be a single piece so that there can be no seam between the housing 10 and the diaphragm 20. Therefore, the number of parts required for the pressure sensor 100 can be reduced. Further, the structure of the pressure sensor 100 can be simplified. Furthermore, leakage of the pressure to be sensed can be prevented so that the pressure sensor 100 can operate properly.

Second Embodiment

Figure 4A:
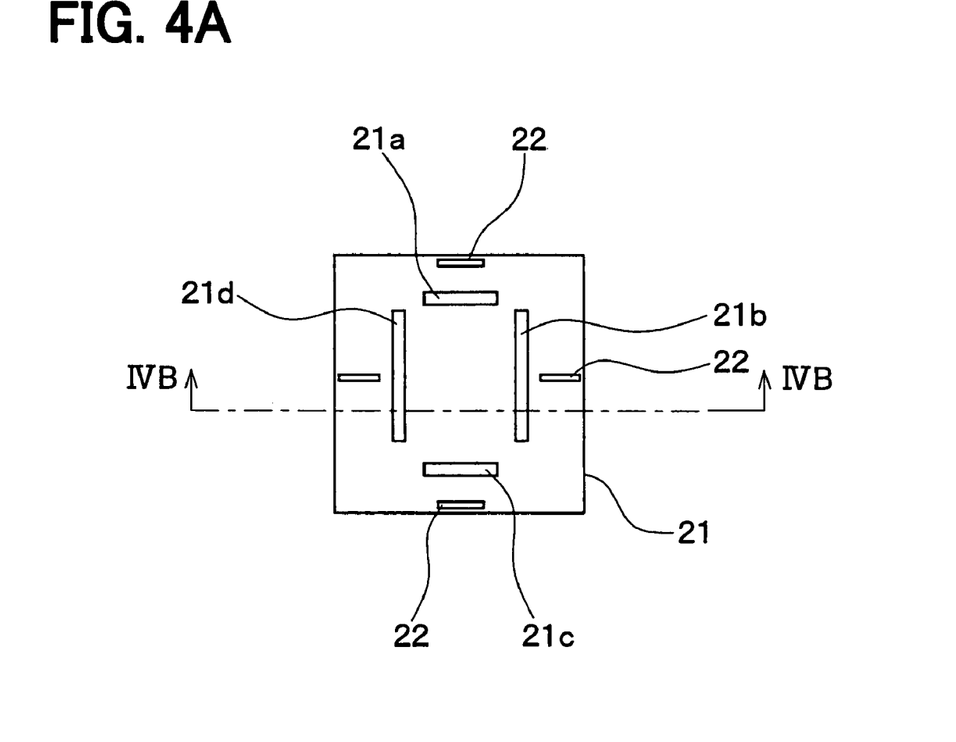
FIG. 4A is a top view of a semiconductor chip of a pressure sensor according to a second embodiment of the present invention.
Figure 4B:
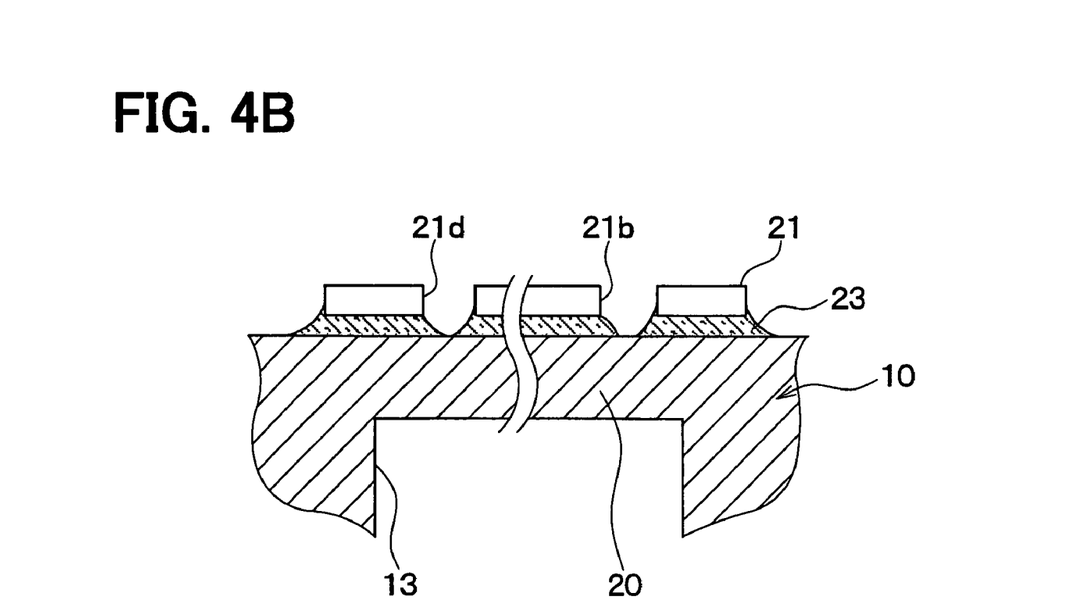
FIG. 4B is a cross-sectional view taken along line IVB-IVB of FIG. 4A.

In the second embodiment, as shown in FIGS. 4A and 4B, a semiconductor chip 21 includes hole portions 21a-21d each of which penetrates through the semiconductor chip 21 in the thickness direction. The hole portions 21a-21d help to reduce thermal expansion and contraction of the semiconductor chip 21. Therefore, the stress due to the difference in thermal expansion coefficient between the diaphragm 20 and the semiconductor chip 21 can be reduced by the hole portions 21a-21d. The number and location of the hole portions 21a-21d can vary. It is preferable that the hole portions 21a-21d are symmetric with respect to a central point of the semiconductor chip 21 to equalize the stress distribution on the semiconductor chip 21.

Third Embodiment

Figure 5:
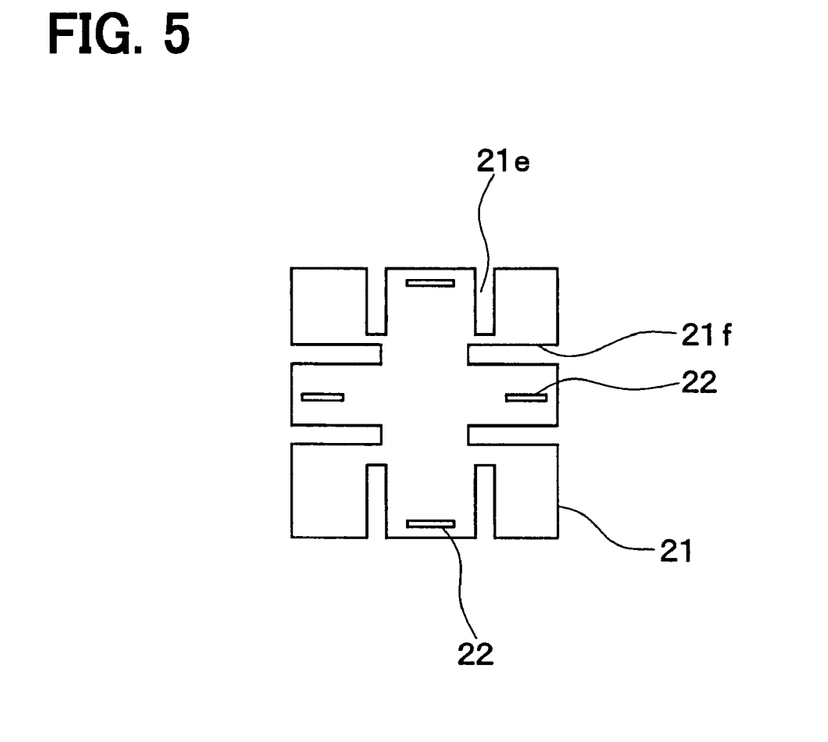
FIG. 5 is a top view of a semiconductor chip of a pressure sensor according to a third embodiment of the present invention.

In the third embodiment, as shown in FIG. 5, a semiconductor chip 21 includes slit portions 21f, 21e each of which extends inwardly from the outer edge of the semiconductor chip 21. The slit portions 21f, 21e help to reduce the thermal expansion and contraction of the semiconductor chip 21. Therefore, the stress due to the difference in thermal expansion coefficient between the diaphragm 20 and the semiconductor chip 21 can be reduced by the slit portions 21f, 21e. The number and location of the slit portions 21f, 21e can vary. It is preferable that the slit portions 21f, 21e are symmetric with respect to the central point of the semiconductor chip 21 to equalize the stress distribution on the semiconductor chip 21.

Fourth Embodiment

Figure 6:
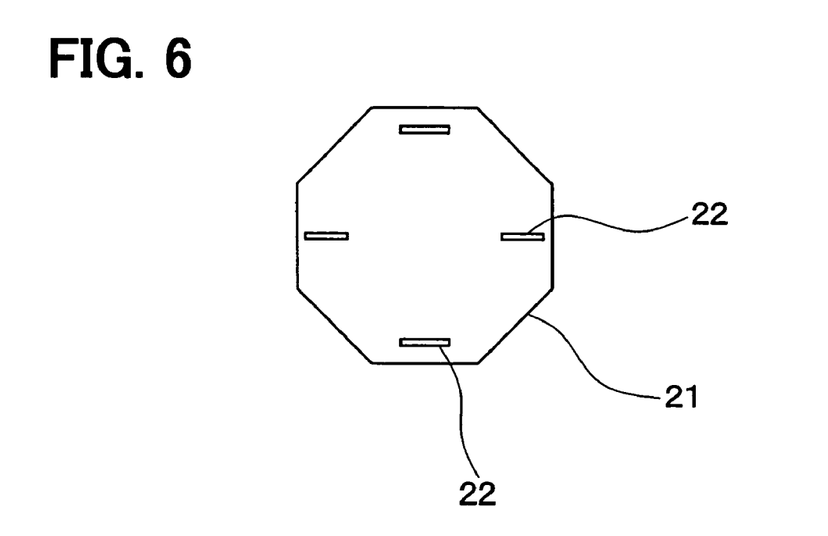
FIG. 6 is a top view of a semiconductor chip of a pressure sensor according to a fourth embodiment of the present invention.

In the fourth embodiment, as shown in FIG. 6, a semiconductor chip 21 has an octagonal shape. Therefore, the semiconductor chip 21 according to the fourth embodiment is more circular than the semiconductor chip 21 according to the above-described embodiments. As the shape of the semiconductor chip 21 is close to circular, the thermal expansion and contraction of the semiconductor chip 21 is small. Therefore, the stress due to the difference in thermal expansion coefficient between the diaphragm 20 and the semiconductor chip 21 can be reduced. The shape of the semiconductor chip 21 can vary. It is preferable that of the semiconductor chip 21 is regular polygon.

Fifth Embodiment

Figure 7:
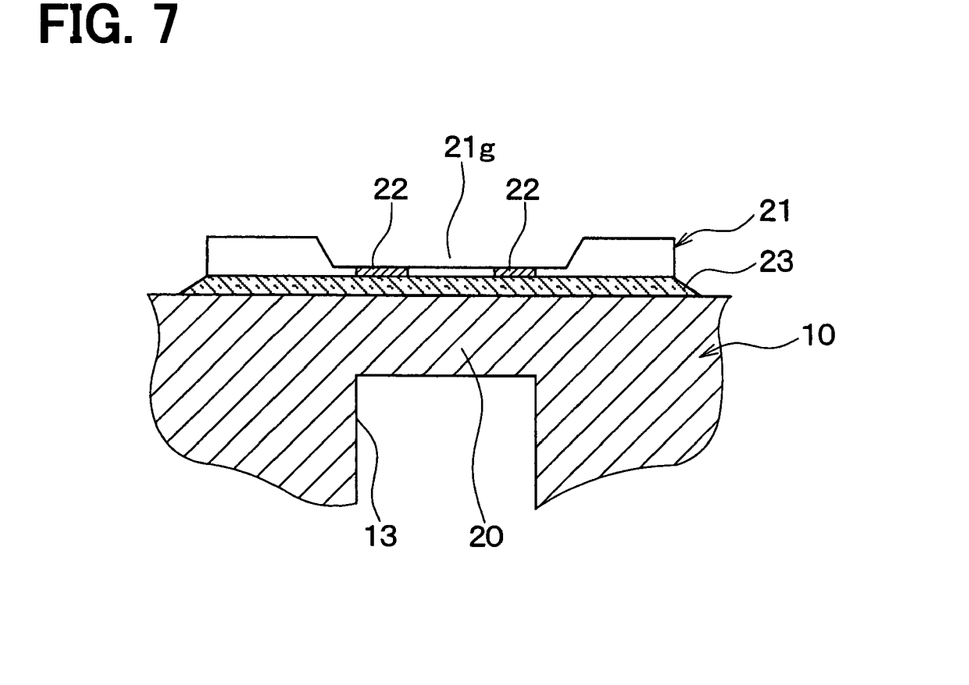
FIG. 7 is a cross-sectional view of a semiconductor chip of a pressure sensor according to a fifth embodiment of the present invention.

In the fifth embodiment, as shown in FIG. 7, a semiconductor chip 21 has a recessed portion 21g in its center. Thus, the semiconductor chip 21 is thin-walled at the center. When viewed from top, the recessed portion 21g has a shape symmetric with respect to the central point of the semiconductor chip 21. For example, the shape of the recessed portion 21g is a circle or a regular polygon such as a square. All the gauge members 22 of the strain gauge are positioned within the recessed portion 21g.

The recessed portion 21g helps to reduce the thermal expansion and contraction of the semiconductor chip 21. Therefore, the stress due to the difference in thermal expansion coefficient between the diaphragm 20 and the semiconductor chip 21 can be reduced by the recessed portion 21g. Further, since all the gauge members 22 are positioned within the recessed portion 21g, stress applied to the gauge members 22 by the deformation of the diaphragm 20 can be equalized.

Alternatively, the semiconductor chip 21 may have a projection portion in its center so that the semiconductor chip 21 is thin-walled at the outer region. When viewed from top, the projection portion has a shape symmetric with respect to the central point of the semiconductor chip 21. For example, the shape of the projection is the circle or the regular polygon such as the square. All the gauge members 22 of the strain gauge are positioned within the recessed portion 21g.

Alternatively, all the gauge members 22 of the strain gauge may be positioned outside the recessed portion 21g or the projection portion.

Modifications

The embodiment described above may be modified in various ways. For example, the area and thickness of the semiconductor chip 21 can vary, as long as the parameter K is less than or equal to 17.

Figure 8:
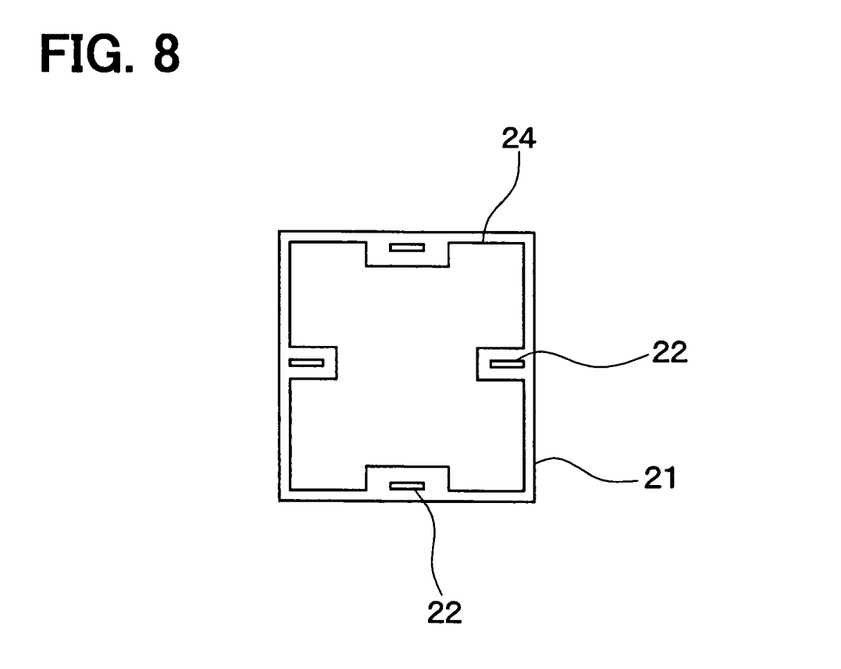
FIG. 8 is a top view of a semiconductor chip of a pressure sensor according to a modification of the present invention.

In the above-described embodiments, the signal processing circuit for processing the electrical signal outputted from the semiconductor chip 21 is included in the circuit board 30. Alternatively, the signal processing circuit may be included in the semiconductor chip 21. For example, as shown in FIG. 8, the gauge members 22 of the strain gauge are individually formed at side regions of the semiconductor chip 21, and a signal processing circuit 24 is formed at a region except the side regions.

The above described embodiments can be combined with one another to effectively reduce the thermal expansion and contraction of the semiconductor chip 21.

Such changes and modifications are to be understood as being within the scope of the present invention as defined by the appended claims.

What is claimed is:

1. A pressure sensor comprising:
    a metal housing including a diaphragm and an inlet for introducing fluid to be sensed to the diaphragm, the diaphragm being unitary with the housing, the inlet having a first end exposed to the diaphragm and a second end exposed to an outside of the housing; and
    a semiconductor chip mounted on the diaphragm, the chip including a strain gauge for producing an electrical signal corresponding to deformation of the diaphragm, the deformation being caused by pressure of the fluid, wherein
    a double logarithmic relationship between shear stress T acting at an interface between the semiconductor chip and the diaphragm and distance X from an outer edge of the interface is given by the following equation:

$$T = KX^{0.4}$$

where K is a parameter, and
area and thickness of the semiconductor chip are set so that the parameter K is less than or equal to 17.

2. The pressure sensor according to claim 1, wherein
the area of the semiconductor chip is less than or equal to 3.0 square millimeters, and
the thickness of the semiconductor chip is less than or equal to 30 micrometers.

3. The pressure sensor according to claim 1, wherein
the area of the semiconductor chip is less than or equal to 1.5 square millimeters, and
the thickness of the semiconductor chip is less than or equal to 40 micrometers.

4. The pressure sensor according to claim 1, wherein
the area of the semiconductor chip is less than or equal to 1.0 square millimeters, and
the thickness of the semiconductor chip is less than or equal to 50 micrometers.

5. The pressure sensor according to claim 1, wherein
the semiconductor chip has a plurality of holes each of which penetrates the semiconductor chip in the thickness direction.

6. The pressure sensor according to claim 5, wherein
the plurality of holes are symmetric with respect to a central point of the semiconductor chip.

7. The pressure sensor according to claim 1, wherein
the semiconductor chip has a plurality of slits each of which extends inwardly from an outer edge of the semiconductor chip.

8. The pressure sensor according to claim 7, wherein
the plurality of slits are symmetric with respect to a central point of the semiconductor chip.

9. The pressure sensor according to claim 1, wherein
an outer periphery of the semiconductor chip is polygonal and has five or more corners.

10. The pressure sensor according to claim 1, wherein
the semiconductor chip has a recessed portion,
the strain gauge has a plurality of gauge members connected in a predetermined configuration, and
all the plurality of gauge members are positioned inside or outside the recessed portion.

11. The pressure sensor according to claim 1, further comprising:
a connector having a terminal pin for transmitting the electrical signal between the semiconductor chip and an external device.

* * * * *